July 5, 1960   E. WOLDRING ET AL   2,943,889
CASTER TRUCK WHEELS
Filed Sept. 27, 1956   2 Sheets-Sheet 1
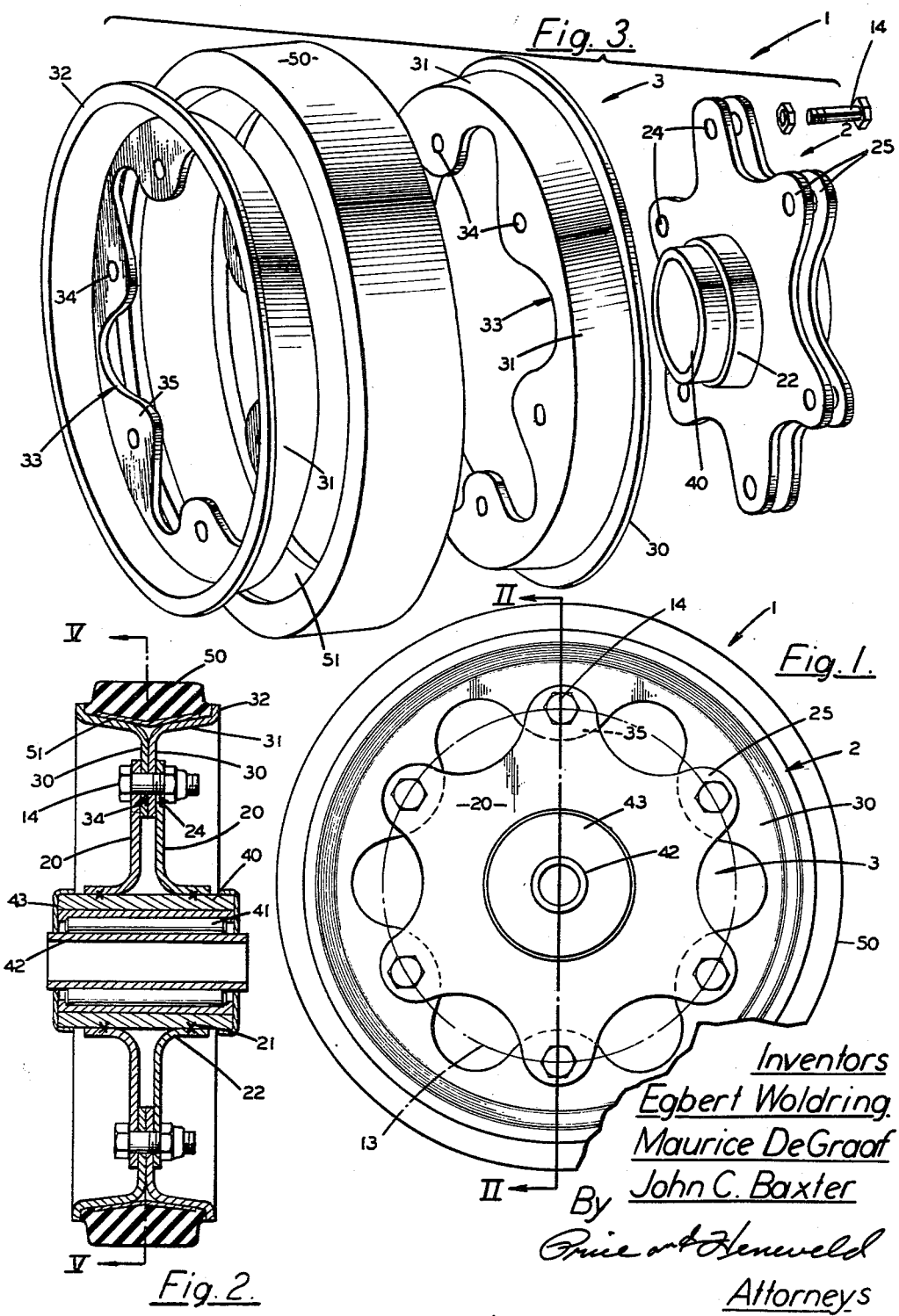
Inventors
Egbert Woldring
Maurice DeGraaf
John C. Baxter
By
Attorneys

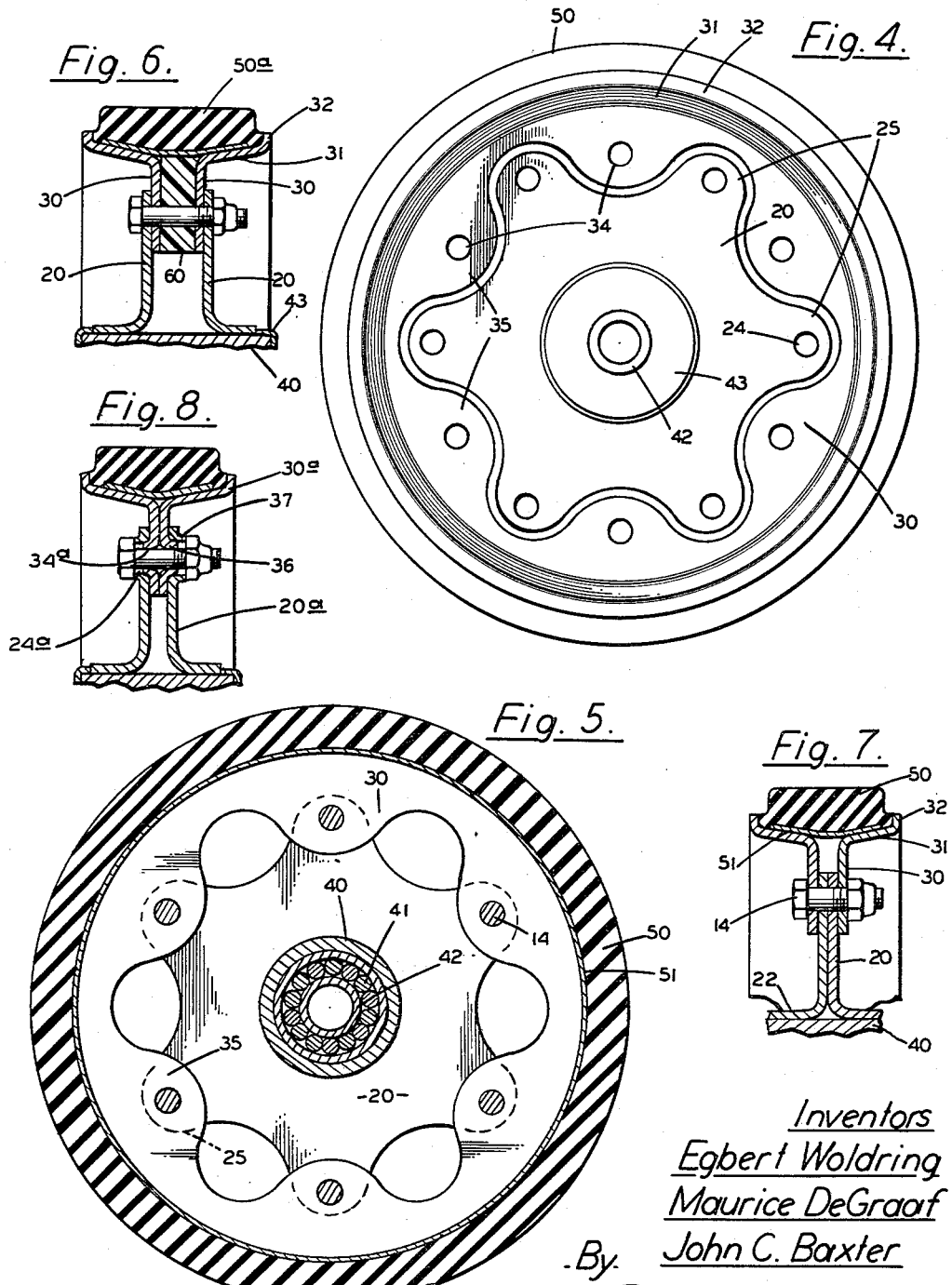

United States Patent Office 2,943,889
Patented July 5, 1960

2,943,889

CASTER TRUCK WHEELS

Egbert Woldring and Maurice De Graaf, Grand Rapids, and John C. Baxter, East Grand Rapids, Mich., assignors to The Rapids-Standard Company, Inc., Grand Rapids, Mich., a corporation of Michigan Filed Sept. 27, 1956, Ser. No. 612,416

10 Claims. (Cl. 301—63)

This invention relates to a demountable rubber tire industrial wheel and more particularly to a caster truck wheel having means for replacing the tire on the wheel.

Demountable tire industrial wheels are not new. Several types of these wheels have existed for some time. One type consists of two single piece tire discs having peripheral flanges for supporting the tire. The two discs are press fitted on a cylindrical hub member and then detachably secured to each other by bolts extending through both of the discs. Although the tire in this type of wheel is replaceable, the time and trouble involved in replacing the wheel is so great that the entire wheel is frequently replaced. The time consumed in changing the tire is long because the two discs first have to be detached one from the other and then removed from the cylindrical hub member on which they are press fitted. In most cases this procedure of removing the tire required special tools.

Because of these difficulties the conventional practice has been to avoid manufacturing large wheels of this type although small wheels capable of being replaced at much less cost than the larger wheels are made. The large diameter wheels, 10 inch and over, are primarily constructed of cast iron having a rubber wheel molded on its periphery. A molded wheel has many disadvantages. It wears more quickly because of its tendency to squash under heavy loads. It is hard to push because of this squashing tendency. Further, the molded type tire requires the costly process of remolding when worn.

The primary object of this invention is to eliminate these disadvantages by providing a novel demountable industrial wheel.

Still another object of this invention is to provide a demountable industrial wheel having a longer life and better roll qualities.

Another object of this invention is to provide a demountable industrial wheel that is easy to assemble.

A further object of this invention is to provide a demountable industrial wheel that facilitates overall savings in initial material cost and time consumption in assembly.

Another object of this invention is to provide a novel industrial wheel structure that permits savings in upkeep due to the ease in replacing worn tires.

Other objects of my invention will become obvious upon reading the following specification in conjunction with the accompanying drawings wherein:

Fig. 1 is a side, elevational view of the assembled wheel.

Fig. 2 is a cross-sectional view taken along the plane II—II of Fig. 1.

Fig. 3 is an oblique, side, elevational view of the component parts of the industrial demountable wheel of this invention.

Fig. 4 is a side, elevational view of our wheel illustrating the relative positions of the hub and rim when in demountable position.

Fig. 5 is a cross-sectional, elevational view taken along the plane V—V of Fig. 2.

Fig. 6 is a partial, cross-sectional view of a modification of my invention.

Fig. 7 is a partial, cross-sectional view of still another modification of my invention.

Fig. 8 is a partial, cross-sectional view of yet another modification of my invention.

Briefly this invention is concerned with an industrial wheel assembly having a cylindrical hub member on which a pair of spaced hub discs are mounted. The hub discs each have a perimeter of varying radial distance from the axis of the hub member. Interposed between the two hub members are a pair of circular disc-like rims. These rims have rim flanges at their peripheries which in combination provide a tire supporting and clampng means for a tire located between the two rims.

The two rims each have a central opening of substantially the same outline as the perimeters of the hub discs. This permits the rims to pass over the hub discs and be rotated between the hub discs. In assembled position the rims are arranged on a common axis with each other and with the hub discs so that the hub disc portions of greatest radial dimensions overlap the rim portions of least radial dimension. The rims are detachably secured to the hub disc at these overlapping portions.

When detached from the hub discs, the rims are adapted to be slidably rotated to a position where they can be removed from the hub disc. In this position the hub discs pass through one of the central openings of one of the rims. When detached from the hub discs the rims can be separated and the tire removed.

In the preferred form of this invention the tire has a metal backing plate on its inner diameter. This backing plate prevents creeping and provides clamping surface for the rims.

Referring to the drawings, reference numeral 1 denotes the demountable industrial wheel which includes the hub sub-assembly 2 and the rim and tire sub-assembly 3. The rim and tire sub-assembly 3 is secured to the hub assembly 2 by the bolts 14.

The hub sub-assembly 2 includes the cylindrical hub member 40, the spaced hub discs 20 and the caps 43 on each end for preventing dirt or other debris from entering the roller bearing races. The hub member 40 contains the conventional roller bearings 41 and the bushing 42. The hub discs 20 each have a central hub opening 21 formed by the sleeve 22. The hub discs are spacedly secured to the cylindrical hub member 40 at the sleeve 22 by spot welding or any other suitable means. The spacing of the two disc members 20 is sufficient for receiving a pair of rim members 30 described in more detail hereinafter.

The perimeters of the hub discs 20 are of varying radial distance from the hub opening 21. Thus, each perimeter defines a plurality of radially extending lobes 25 of greater radial dimension from hub opening 21 than the remaining portions. The perimeter of each disc preferably describes a radially symmetrical figure. By "radially symmetrical" we mean that the figure is divisible into equal symmetrical portions by any plane passing through the center axis and any point of greatest radial distance from the axis. For example, the six lobes 25 are equally spaced around the circumference of the hub discs and any plane through the center axis and the outermost point of any lobe will divide the figure described by the perimeter into equal symmetrical portions. Other examples of radially symmetrical figures are an equilateral triangle, a rectangle, a polygon, and a symmetrical star. Each lobe has a hole 24 for receiving the bolt 14.

The tire and rim assembly includes two identical rim members 30 and the tire 50 interposed between the two rim members. Each rim includes the rim flange 31 having a radially extending flange 32. Each rim 30 has a central opening 33 corresponding in shape to the perimeters of the hub discs 20. The openings 33 are slightly larger than the hub disc but similar in shape so as to permit the rims to pass over the hub discs. The opening 33 in the central portion of the rim creates the inwardly extending lobes 35 which constitute the portions of least radial dimension from the center of the discs. The lobes 35 have holes 34 for receiving bolts 14. The holes 34 are located on the same circumference 13 as holes 24.

The tire 50 is a solid rubber tire having a metal backing plate 51. This plate bearing against the flanges 31 provides clamping surface for the rims and prevents creeping of the tire.

When assembled, the tire 50 is clamped between the rim portions 31 of the rim member 30. Thus, the rim flanges 32 contain the tire and keep the rubber in compression when under load. The rim members 30 are held between the hub discs 20. The lobes 25 and 35 overlap so that the holes 24 and 34 in the lobes are aligned for receiving the bolts 14.

The method of fabricating this wheel is the subject of our co-pending United States application Serial No. 612,417, filed September 27, 1956, entitled Method of Making Wheels. Briefly it comprises providing a sheet of metal and forming it into a circular one piece disc corresponding in outline to one of the rims. The circular discs are severed along a line of varying radial distance from the center of the disc to form the rim 30 and the hub disc 20. The hub discs are fitted and secured to the cylindrical member 50 in spaced relationship. After providing a tire 50, the wheel is then ready for assembly as illustrated by Fig. 3. For a more detailed explanation of this method, reference is made to our co-pending application simultaneously filed with this application.

Assembly and installation of tire

The assembly of the component parts illustrated in Fig. 3 is relatively simple. The rims are placed inside the tire and pressed into proper position with the opening 33 of one rim aligned with the opening 33 of the other. In this position the lobes 35 and the holes 34 in the lobes are aligned for receiving the bolt 14.

Having assembled the rim on the tire, opening 33 of the rim are aligned with the perimeters of the hub disc 20 (Fig. 4). Then the hub sub-assembly is inserted through the hole 33 or the rim-tire sub-assembly is passed over the hub sub-assembly. In either case the ultimate relative positions of the two sub-assemblies are such that rotation of the hub or rim will cause the central portion of the rim to pass between the hub discs or rim. The hub sub-assembly or rim-tire sub-assembly is then rotated so that the lobes 25 overlap lobes 35 and match the holes 34. The bolts 14 are inserted through the holes and tightened.

Removing a worn tire and replacing it with a new one is also a simple procedure. A wrench and/or other suitable tools are utilized to loosen the nuts on the bolts 14 and remove the bolts. After the bolts 14 are out, a simple twist or a rotation of the wheel assembly aligns the hub discs with the openings 33 permitting the hub sub-assembly to be withdrawn from the rims. Then sharply bouncing the tire on the floor or bench causes the wheel rims to fall away from the tire. The rims are then placed inside a new tire and pressed in the proper position as previously described. The installation and assembly of the hub and bolts is then repeated.

The wheel of this invention materially reduces the replacement cost of industrial wheels. In the past large wheels have required molding of the tires on a cast wheel, and subsequent remolding when worn. This invention eliminates all such costly and time consuming procedures.

A new tire costs considerably less than remolding. It can be quickly and easily replaced at the very location of the plant rather than at a remolding factory. The sometimes frequent practice of discarding the entire worn wheel and purchasing a new one is eliminated. The time consumed in replacing the wheel is short so that cost in expended man-hours is low.

This wheel also is stronger and less costly to manufacture. Although the cost of such manufacture relates more to the method of manufacture, as disclosed and claimed in my co-pending application, the cost advantage also pertains to this application on the wheel itself. Whereas in other demountable wheels of this type the hub discs are mounted on the hub solely by the press fit, greater strength is provided to this wheel at this critical point because the hub discs 20 are welded to hub member 40.

This invention solves a long felt want for an easily demountable tire having a longer life and better rollability. Present day cast iron molded tires are customarily made in thick sections to provide maximum life. This thick section tends to squash under heavy loads, requiring more force to roll the wheels. This invention solves the problem by providing a thinner tire and a novel demountable means that is economically feasible. The thin demountable tire being replaceable at less cost offers to the user the best compromise between wear and rollability.

Modifications

Fig. 6 shows a modification of our invention. This modification is adapted for supporting wider tires without increasing the width of the rim flanges. In accordance with this modification the hub discs 20 are spaced a greater distance than that shown in Fig. 2. To compensate for this spacing a spacer 60 is provided between the rims 30. This spacer holds the flanges 31 and 32 farther apart thus making it possible for the rim flanges to support a greater width tire 50a. It should be evident in accordance with this modification that variable sizes of tires can be supported by the basic components of this invention.

Fig. 8 illustrates a modification designed to eliminate slippage between the rim and hub discs. Reference numerals 20a and 30a denote modified hub and rim discs respectively. Both of these discs have draw neck holes designated as 24a and 34a. These holes are drawn to the outside of the wheel forming the necks 36 of rim disc 30 which are seated in the recessed openings formed by necks 37 of hub disc 20. The necks are drawn 10/1000 to 15/1000 inches although Fig. 8 shows a much greater draw to accentuate and illustrate the principle. The draw neck holes are preferably formed during the piercing step.

This modified structure is assembled like the embodiments previously described. The tire and rim subassembly is inserted over the hub subassembly. Then the tire and rim subassembly is rotated. The lobes 25 of hub discs 20 are capable of slightly flexing as the necks 36 wedge between them. Eventually the necks 36 ride into the recess formed by neck 37 and the lobes under stress clamp on the rims. Thus, this structure not only prevents slippage between the discs but also aids in aligning or indexing holes 24a and 34a.

Fig. 7 shows still another modification in which the rims 30 are located outwardly of the hub discs 20. This also increases spacing between the rim flanges 31 and 32 of each rim member resulting in the capability of supporting a wider tire. It should be understood that several different modifications similar to that of Figs. 6 and 7 are possible without departing from the scope of this invention.

Having described our invention it should become obvious that although we have disclosed preferred forms, several other forms and modifications are possible within the broadest aspect of this invention. Therefore, this invention should be limited not only to those specifically described but all equivalent modifications unless the claims by their language expressly state otherwise.

We claim:

1. An industrial wheel assembly comprising a cylindrical hub member; a pair of hub discs mounted on said member, said hub discs having a perimeter of varying radial distance from the axis of said hub member; a pair of circular disc-like rims, said rims having combined tire supporting and clamping means at their peripheries, said rims each having a central opening of substantially the same outline as the perimeters of said hub discs, said hub discs being spaced one from the other a distance sufficiently great to receive said rims and permit relative rotational sliding movement between said composite rims and said hub discs, said rims being arranged on a common axis with each other and said hub discs so that the hub disc portions of greatest radial dimension overlap the rim portions of least radial dimension; a tire in said combined clamping means; and means for attaching said rims to said hub discs at said overlapping portions.

2. An industrial wheel assembly comprising a cylindrical hub member; a pair of hub discs mounted on said member, said hub discs having a perimeter of varying radial distance from the axis of said hub member; a pair of circular disc-like rims, said rims having combined tire supporting and clamping means at their peripheries, said rims each having a central opening of substantially the same outline as the perimeters of said hub discs, said rims being arranged on a common axis with each other and said hub discs so that the hub disc portions of greatest radial dimension overlap the rim portions of least radial dimension, said hub discs being the cutoff portions from the central opening of said rim disc; and means for attaching said rims to said hub discs at said overlapping portions.

3. An industrial wheel assembly comprising a cylindrical hub member; a pair of hub discs mounted on said member, said hub discs each having a perimeter defining an outline having a plurality of lobe portions extending radially outwardly from the center of said discs; a pair of circular disc-like rims, said rims having combined tire supporting and clamping means at their peripheries, said rims each having a central opening of substantially the same outline as the perimeters of said hub discs thereby having lobes extending radially inwardly from its center, said hub discs being the cutoff portions from the central opening of said rim discs, said rims being arranged on a common axis with each other and said hub discs and being arranged in rotative positions so that the hub disc lobes overlap the rim lobes; a tire in said combined clamping means; and means for attaching said rims to said hub discs at said lobes.

4. The industrial wheel assembly of claim 3 in which the outline defined by the hub disc perimeters is radially symmetrical whereby the lobe portions are equally spaced about the circumference of said hub discs.

5. The industrial wheel assembly of claim 1 in which the hub discs are rigidly secured to the hub member.

6. An industrial wheel assembly comprising a cylindrical hub member; a pair of hub discs mounted on said member, said hub discs abutting one another; said hub discs having a perimeter of varying radial distance from the axis of said hub member; a pair of circular disc-like rims, said rims having combined tire supporting and clamping means at their peripheries, said rims each having a central opening of substantially the same outline as the perimeters of said hub discs, said rims being spaced to receive said hub discs and each to bear against the outer side of one of said hub discs and arranged on a common axis with each other and said hub discs so that the hub disc portions of greatest radial dimension overlap the rim portions of least radial dimension; a tire in said combined clamping means; and means for attaching said rims to said hub discs at said overlapping portions.

7. A caster wheel assembly comprising a cylindrical hub member; a pair of hub discs spacedly mounted on said member a predetermined distance, said hub discs having a perimeter of varying radial distance from the axis of said hub member; a pair of circular disc-like rims each having a central portion and a rim flange portion, said rim flange portions being adapted to support tires of various widths depending upon the spacing of said rims, said rims each having an opening in its central portion of substantially the same outline as the perimeters of said hub discs, said rims bearing against and arranged between said hub discs and spaced one from the other for receiving a certain width tire; a spacer between said central portions of said rims; said rims being arranged on a common axis with each other and said hub discs so that the hub disc portions of greatest radial dimension overlap the rim portions of least radial dimension; a tire in said combined clamping means; and means for attaching said rims to said hub discs at said overlapping portions.

8. An industrial wheel assembly comprising a cylindrical hub member; a pair of hub discs mounted on said member, said hub discs having a perimeter of varying radial distance from the axis of said hub member; a pair of circular disc-like rims, said rims each having a central opening of substantially the same outline as the perimeters of said hub discs, said hub discs being the cut off portions from the central opening of said rim disc, said rims being arranged on a common axis with each other and said hub discs so that the hub disc portions of greatest radial dimension overlap the rim portions of least radial dimension; a tire in said combined clamping means; and means for attaching said rims to said hub discs at said overlapping portions.

9. An industrial wheel assembly comprising a cylindrical hub member; a pair of hub discs mounted on said member, said hub discs each having a perimeter defining an outline having a plurality of lobe portions extending radially outwardly from the center of said discs; a pair of circular disc-like rims, said rims having combined tire supporting and clamping means at their peripheries, said rims each having a central opening of substantially the same outline as the perimeters of said hub discs thereby having lobes extending radially inwardly from its center, said rims being arranged on a common axis with each other and said hub discs so that the hub disc lobes overlap the rim lobes; a tire in said combined clamping means; a plurality of holes in said lobes, said holes having drawn necks extending in the same direction, the necks of one set of lobes extending into the recessed hole formed behind the necks of the other set of lobes; and means extending through said holes for attaching said rims to said hub discs.

10. An industrial wheel assembly comprising a hub sub-assembly including a cylindrical hub member; a pair of hub discs mounted on said member, said hub discs having a perimeter of varying radial distance from the axis of said hub member; and a rim and tire sub-assembly including a pair of circular disc-like rims, said rims having combined tire supporting and clamping means at their peripheries, said rims each having a central opening of substantially the same outline as the perimeters of said hub discs; a tire between said combined clamping means; said rim and tire sub-assembly being arranged on a common axis with said hub sub-assembly so that in one rotated position said hub sub-assembly is adapted to be received by said rim opening and in another rotative position the hub disc portions of greatest radial dimension overlap the rim portions of least radial dimension;

the wheel assembly having at least one of said pair of discs arranged back to back and the other pair of discs being spaced to receive said one pair of discs therebetween; and means for attaching said rims to said hub discs at said overlapping portions.

References Cited in the file of this patent

UNITED STATES PATENTS

| | | |
|---|---|---|
| 1,442,603 | Coates | Jan. 16, 1923 |
| 1,562,696 | Garriott | Nov. 24, 1925 |
| 2,014,247 | Eksergian et al. | Sept. 10, 1935 |
| 2,476,059 | Mertz | July 12, 1949 |
| 2,559,975 | Lange et al. | July 10, 1951 |
| 2,600,033 | Walklet | June 10, 1952 |
| 2,606,076 | Frazer | Aug. 5, 1952 |
| 2,620,675 | Meadows | Dec. 9, 1952 |

FOREIGN PATENTS

| | | |
|---|---|---|
| 666,566 | France | May 27, 1929 |
| 909,095 | France | Nov. 26, 1945 |